(12) United States Patent
Yu et al.

(10) Patent No.: US 8,821,678 B1
(45) Date of Patent: Sep. 2, 2014

(54) ELECTRONIC DEVICE ENCLOSURE ASSEMBLY

(71) Applicant: Google Inc., Mountain View, CA (US)

(72) Inventors: Michelle Yu, Oakland, CA (US); Jeffrey Hayashida, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/041,453

(22) Filed: Sep. 30, 2013

(51) Int. Cl.
*G06F 1/16* (2006.01)

(52) U.S. Cl.
CPC ............... *G08F 1/16* (2013.01); *G06F 1/1601* (2013.01); *G06F 1/1637* (2013.01)
USPC ............. 156/308.2; 156/308.4; 156/321; 156/322; 361/600; 361/679.01; 361/679.02; 361/679.26

(58) Field of Classification Search
CPC ........ G06F 1/16; G06F 1/1601; G06F 1/1637
USPC ............ 156/308.2, 308.4, 321, 322; 361/600, 361/679.01, 679.02, 679.26
See application file for complete search history.

(56) References Cited

U.S. PATENT DOCUMENTS

2007/0109737 A1*  5/2007  Kriege et al. ................ 361/683
2011/0090630 A1*  4/2011  Bergeron et al. ........ 361/679.26

* cited by examiner

Primary Examiner — Jeff Aftergut
Assistant Examiner — Jaeyun Lee
(74) Attorney, Agent, or Firm — Brake Hughes Bellermann LLP (57) ABSTRACT

A method includes forming an assembly of a first part of a computing device enclosure and a second part of the computing device enclosure by disposing a thermoplastic adhesive layer between a surface portion of the first part and an opposing surface portion of the second part. The surface portion of the first part and the opposing surface portion of the second part define one or more bonding areas of the first part and the second part across a lateral extent of the assembly. The assembly has a non-uniform thermal mass distribution across its lateral extent. The method further includes applying spatially varying amounts of heat to the assembly across its lateral extent to soften the thermoplastic adhesive layer in the bonding areas relatively uniformly across the lateral extent of the assembly compared to applying a non-spatially varying amount of heat across the lateral extent of the assembly.

20 Claims, 14 Drawing Sheets

810
forming an assembly of a first part of a computing device enclosure and a second part of the computing device enclosure by disposing a thermoplastic adhesive layer between a surface portion of the first part and an opposing surface portion of the second part

820
applying spatially varying amounts of heat to the assembly across its lateral extent to soften the thermoplastic adhesive layer in the bonding areas relatively uniformly across the lateral extent of the assembly compared to applying a non-spatially varying amount of heat across the lateral extent of the assembly

822
compensating for the non-uniform thermal mass distribution of the assembly across its lateral extent

824
contacting a portion of the first part in the assembly with a heated block

830
applying pressure to the assembly while applying spatially varying amounts of heat to the assembly across its lateral extent

840
preheating the assembly to tack the thermoplastic adhesive layer to at least one of the surface portion of the first part and the opposing surface portion of the second part

850
cooling the assembly after softening the thermoplastic adhesive layer in the bonding areas

FIG. 8

ELECTRONIC DEVICE ENCLOSURE ASSEMBLY

TECHNICAL FIELD

This description generally relates to electronic device enclosures. The description, in particular, relates to electronic enclosures or housings for laptop computers and other portable computing devices.

BACKGROUND

Hollow enclosures ("electronic enclosures') are commonly used to house electrical or electronic components and circuits ("electronic assemblies") of a variety of electronic products and instruments. The electronic enclosures serve to provide structural support to hold the electronic assemblies in place and also to protect or isolate the electronic assemblies from external environmental hazards (e.g., dust). The variety of electronic products and instruments using such electronic enclosures is diverse (e.g., consumer electronics, game consoles, handheld and desktop computers, industrial PC's, keyboards, computer input devices, pushbuttons, cell phones, smartphones, and charging stations, etc.).

The electronic enclosures are often made by fitting or joining together, for example, several shaped parts or sub-parts (including parts or sub-parts of the enclosed electronic assemblies). For example, an electronic enclosure for a common computer keyboard includes a shaped top panel fitted on to a shaped semi-hollowed bottom panel. The two panels, which may be glued, screwed or fastened together, are shaped to form a hollow space or cavity to hold keyboard switches and circuits. The top panel may include cutouts for securely mounting and surrounding "keys" or pushbuttons.

In general, the electronic enclosures may include several components or parts made of different materials (e.g., metal, plastics, composites, etc.). The components or parts can have complicated geometries, which can make joining them together challenging.

Thus, a need exists for systems, methods, and apparatus to address the shortfalls of present technology and to provide other new and innovative features.

SUMMARY

Methods for thermally bonding parts of electronic device enclosures are described herein.

In a general aspect, a method includes inserting a midplane plate having a thermoplastic adhesive layer into a base frame of a computing device enclosure, and contacting the thermoplastic adhesive layer of the midplane plate to an inner surface of the base frame of the computing device enclosure. The method further includes applying, to the midplane plate, a heat press block having a first portion and a second portion in contact with the midplane plate, and heating the first portion of the heat press block to a first temperature and heating the second portion of the heat press block to a second temperature higher than the first temperature.

In a general aspect, a method includes gluing a surface portion of a midplane plate and a surface portion of a base frame of a laptop computer enclosure together using an intervening thermoplastic adhesive layer. The method further includes applying a first amount of heat to a front portion of the midplane plate and a second amount of heat to a rear portion of the midplane plate to soften the intervening thermoplastic adhesive layer.

In an aspect of the method, applying a first amount of heat to a front portion of the midplane plate and a second amount of heat to a rear portion of the midplane plate includes applying a heat press block to the midplane plate, the heat press block having a first portion heated to a first temperature and a second portion heated to a second temperature in contact with the midplane plate.

In a general aspect, a method includes forming an assembly of a first part of a computing device enclosure and a second part of the computing device enclosure by disposing a thermoplastic adhesive layer between a surface portion of the first part and an opposing surface portion of the second part. The surface portion of the first part and the opposing surface portion of the second part define one or more bonding areas of the first part and the second part across a lateral extent of the assembly. The assembly can have a non-uniform thermal mass distribution across its lateral extent.

The method further includes applying spatially varying amounts of heat to the assembly across its lateral extent to soften the thermoplastic adhesive layer in the bonding areas relatively uniformly across the lateral extent of the assembly compared to applying a non-spatially varying amount of heat across the lateral extent of the assembly.

In an aspect, applying spatially varying amounts of heat to the assembly across its lateral extent includes compensating for the non-uniform thermal mass distribution of the assembly across its lateral extent.

In a further aspect, applying spatially varying amounts of heat to the assembly across its lateral extent can include contacting a portion of the first part in the assembly with a heated block. The heated block can have multiple zones in contact with the portion of the first part, each zone heated to a different temperature.

The details of one or more implementations are set forth in the accompanying drawings and the description below. Other features will be apparent from the description and drawings, and from the claims.

DETAILED DESCRIPTION

Thermoplastic adhesives films (e.g., thermal bonding films) may be used to join enclosure parts ("substrates") made of diverse materials (e.g., plastic, metals, etc.). To make a bond between two substrates, a thermoplastic adhesive in the form of a thermal bonding film may be disposed between opposing surfaces of the two substrates. The thermoplastic adhesive film may be a few mils (e.g., 4 mils) thick. Then, the bond between the two substrates may be made by applying heat and pressure using a heated static press or similar equipment. Alternatively, the thermoplastic adhesive can be first tacked or lightly bonded to one of the substrates using low heat. The second substrate may then be placed on the exposed adhesive surface and the bond between the first substrate and the second substrate made by applying heat and pressure using the heated static press or similar equipment.

Figure 1A:
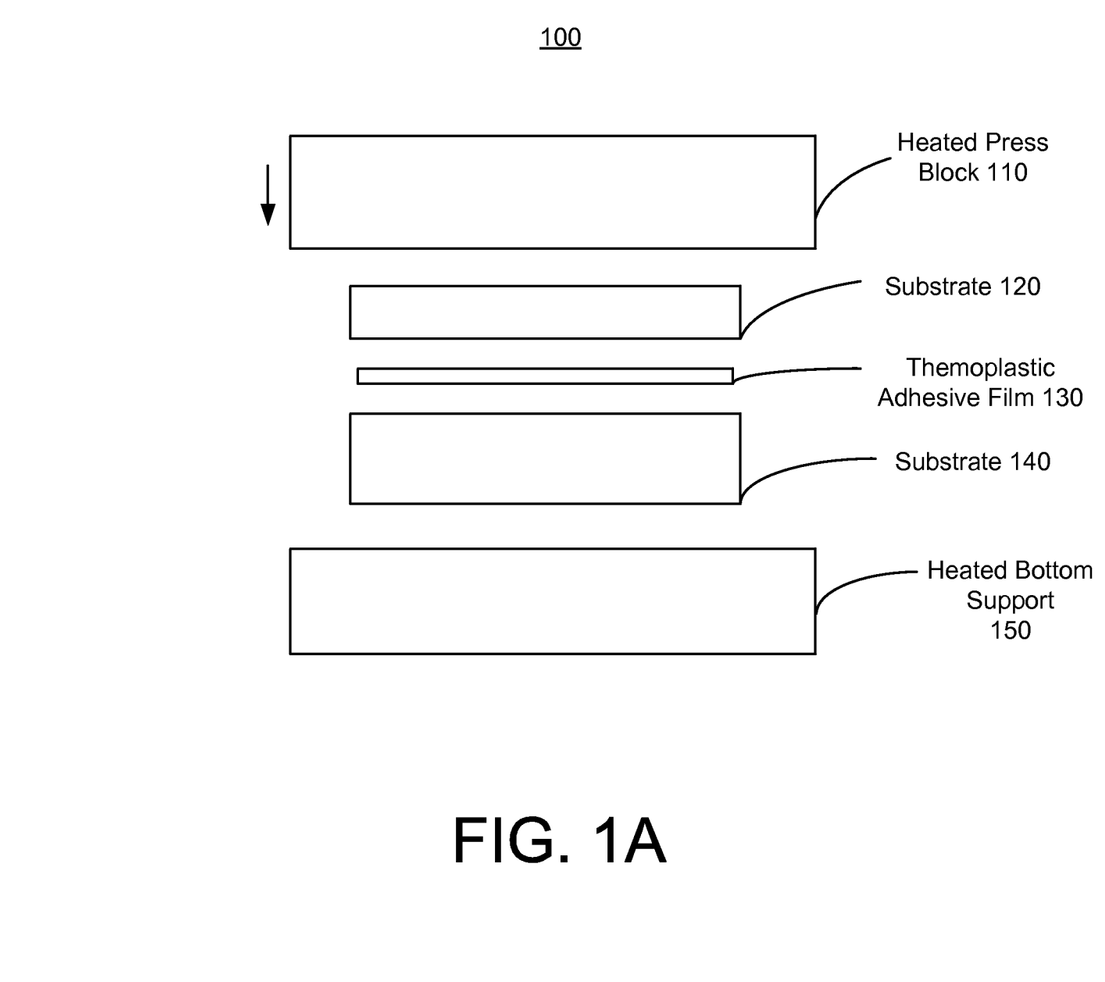
FIG. 1A is a schematic illustration of the use of a thermal press to thermally bond two substrates together.

FIG. 1A shows schematically, in exploded view, a use of a thermal press 100 to thermally bond two substrates (e.g., substrates 120 and 140) together. First, a thermoplastic adhesive film 130 is disposed between opposing surfaces of substrates 120 and 140 to form a glued assembly of the substrates. The glued assembly of substrates 120 and 140 may then be placed on a heated support block 150 in thermal press 100. Next, a heated press block 110, which may be heated to a temperature $T_1$, is applied under pressure to the glued assembly of substrates 120 and 140. The heat and pressure of heated press block 110 may soften thermoplastic adhesive film 130 so that it adheres to and bonds substrates 120 and 140 together. The heat and pressure applied, and the dwell time of heated pressure block 110 for effective bonding may depend upon the type and thickness of the substrates being bonded together in addition to depending on the flow properties of the thermoplastic adhesive film.

A softening temperature range of the thermoplastic adhesive film for effective bonding may be narrow, (e.g., in a range of a few degrees centigrade). For certain applications (e.g., a laptop computer enclosure assembly) substrates 120 and 140 may have structural non-uniformities and non-uniform thermal mass distributions across a lateral extent of the glued assembly of the substrates. These non-uniformities may make it difficult to achieve uniform softening temperatures in the narrow range for effective bonding across the lateral extent of the glued assembly of the substrates by application of heated press block 110 heated to temperature $T_1$.

A method for thermally bonding parts of an electronic device enclosure involves applying spatially varying amounts of heat to a glued assembly of the parts across a lateral extent of the assembly, in accordance with the principles of the disclosure herein.

The method described herein may be used to bond parts that have structural non-uniformities and which present non-uniform thermal mass distributions across a lateral extent of a glued assembly of the parts. Application of the spatially varying amounts heat may compensate for the structural non-uniformities and the non-uniform thermal mass distributions to achieve a more uniform softening temperature of the thermoplastic adhesive across the lateral extent of the glued assembly of the parts.

Figure 1B:
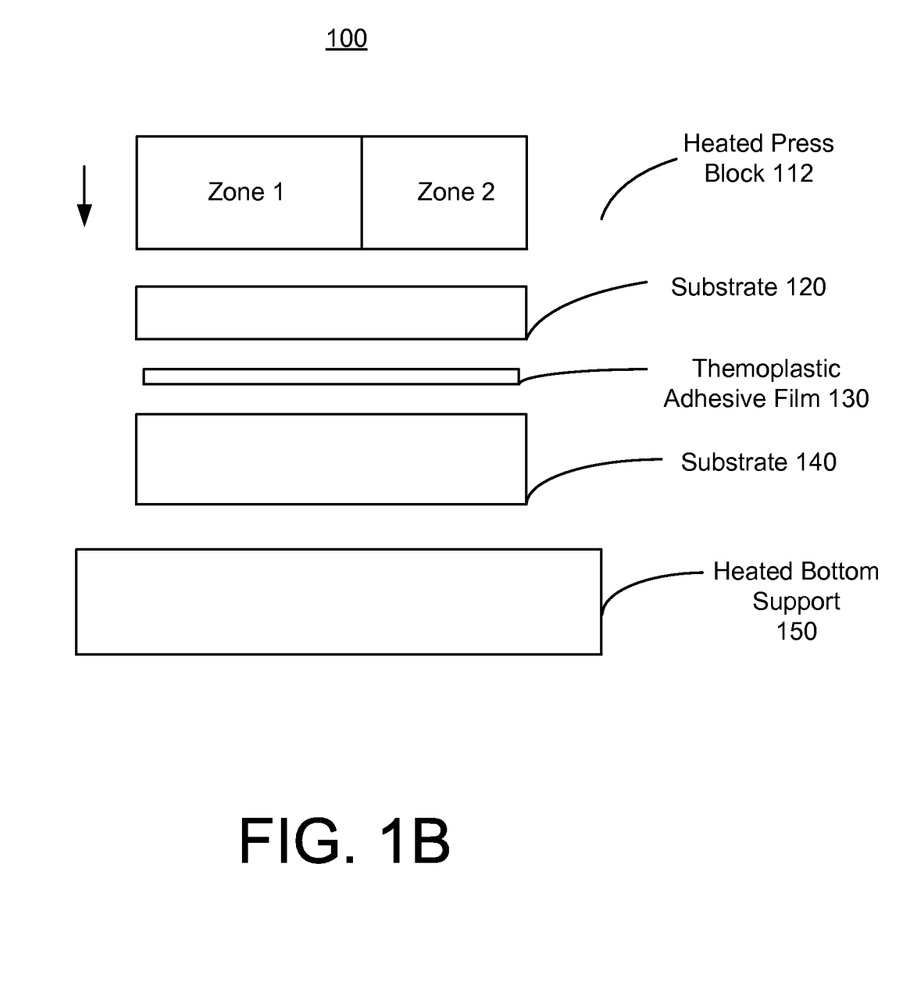
FIG. 1B is a schematic illustration of an example modification of the thermal press of FIG. 1A for applying spatially varying amounts of heat to a glued assembly of parts.

FIG. 1B shows an example modification of thermal press 100 for applying spatially varying amounts of heat to a glued assembly of the parts. As shown in the figure, thermal press 100 may include a thermal press block 112, which has two spatially different heated zones—zone 1 heated to a temperature $T_1$ and zone 2 heated to a different temperature $T_2$. Using such a thermal press block 112, it may be possible to heat a first spatial portion of the glued assembly of substrates 120 and 140 to temperature $T_1$ and a second spatial portion of the glued assembly of substrates 120 and 140 to a different temperature $T_2$ in thermal press 100.

For purposes of illustration, the disclosed method for thermally bonding parts of an electronic device enclosure by applying spatially varying amounts of heat to a glued assembly of the parts is described below with reference to FIGS. 2-5C using specific parts of a laptop computer enclosure as an example. However, it will be understood that the method is not limited to the specific parts of the laptop computer enclosure, but can be used to bond other laptop computer or electronic device enclosure parts.

Example Thermal Bonding of a Laptop Computer Enclosure's Parts

Figure 2:
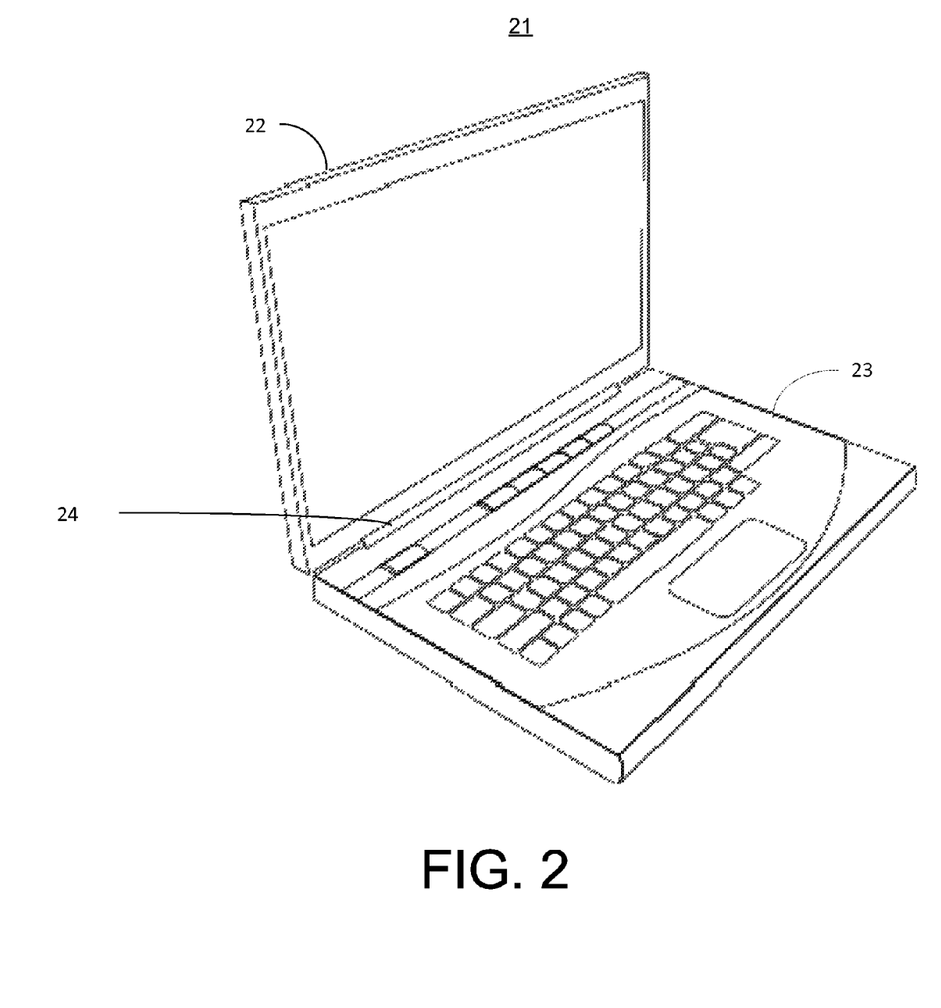
FIG. 2 is an illustration of an example laptop computer.

FIG. 2 shows an example laptop computer 21. The laptop computer, which may have a clamshell form factor, may be formed from two housings—a "display" or top housing 22, and a "keyboard" or bottom housing 23. Top housing 22 may, for example, include a display, a touch screen, a cover glass, etc. Bottom housing 23 may, for example, include circuit boards including electrical components, a keyboard, a track pad, etc. The top housing, which may be pivotally connected by a hinge assembly 24 to the bottom housing, may serve as a lid for the latter in a closed position of the laptop computer.

Figure 3A:
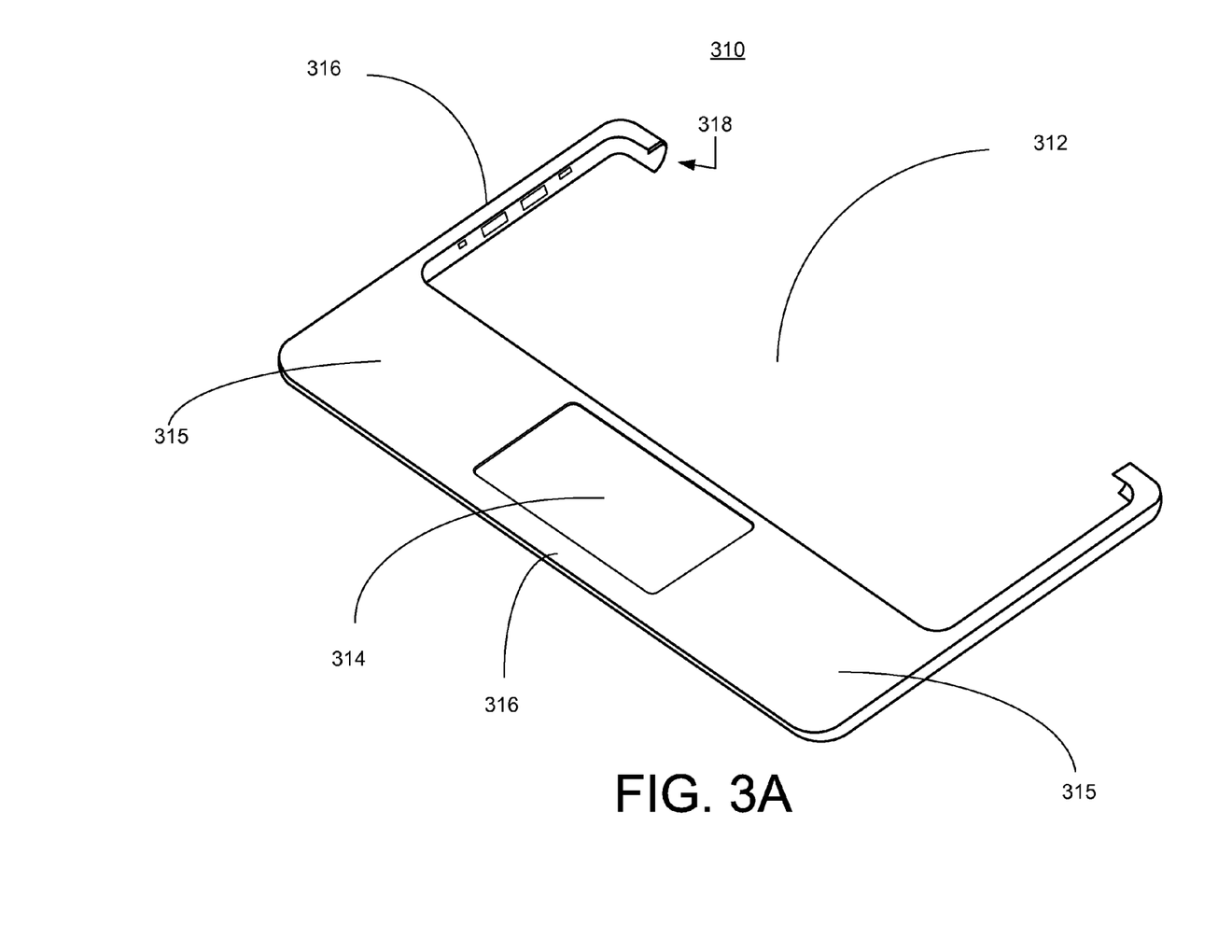
FIGS. 3A-3C are illustrations of example parts of a bottom housing of a laptop computer that can be thermally bonded together by applying spatially varying amounts of heat in a thermal press, in accordance with the principles of the disclosure herein.
Figure 3B:
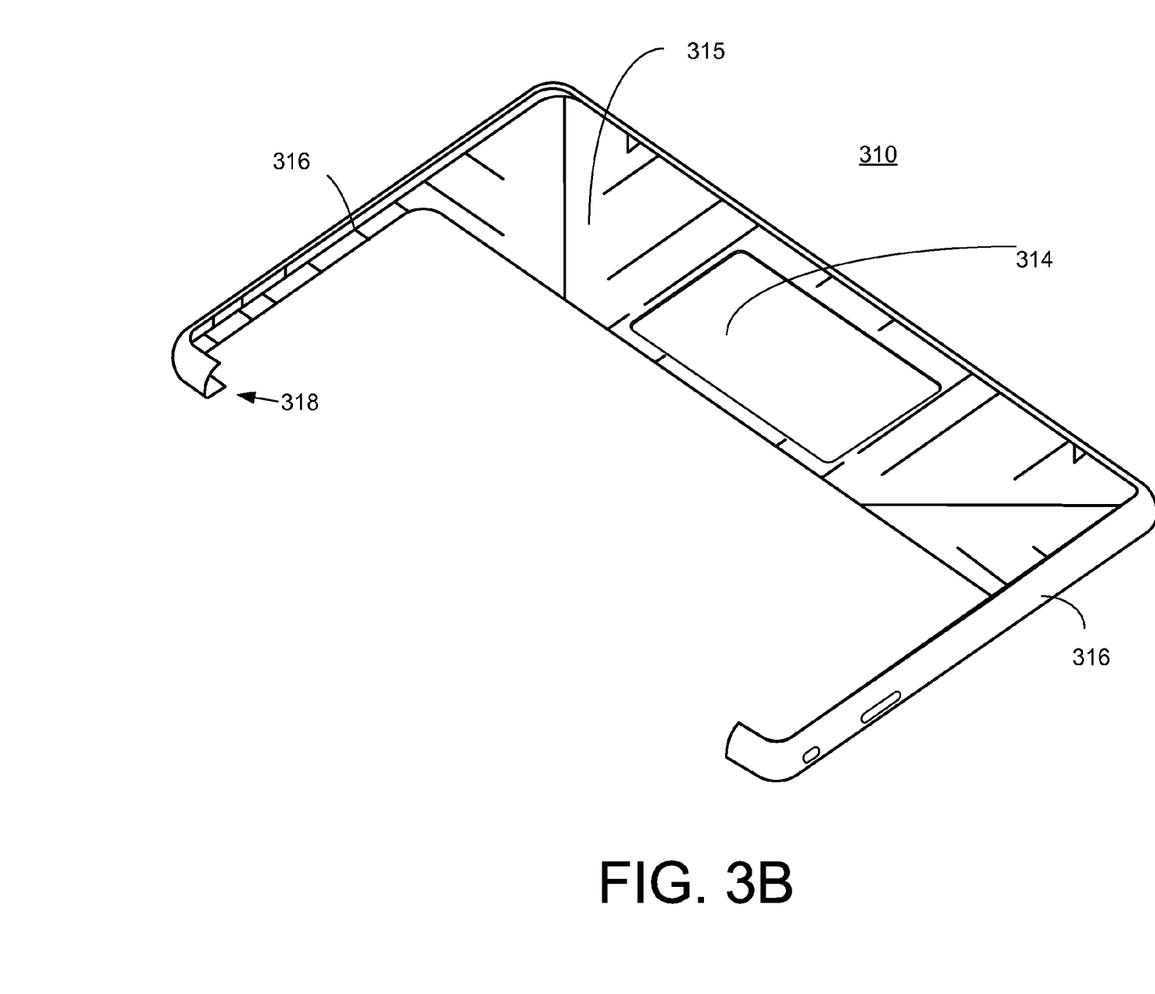
Figure 3C:
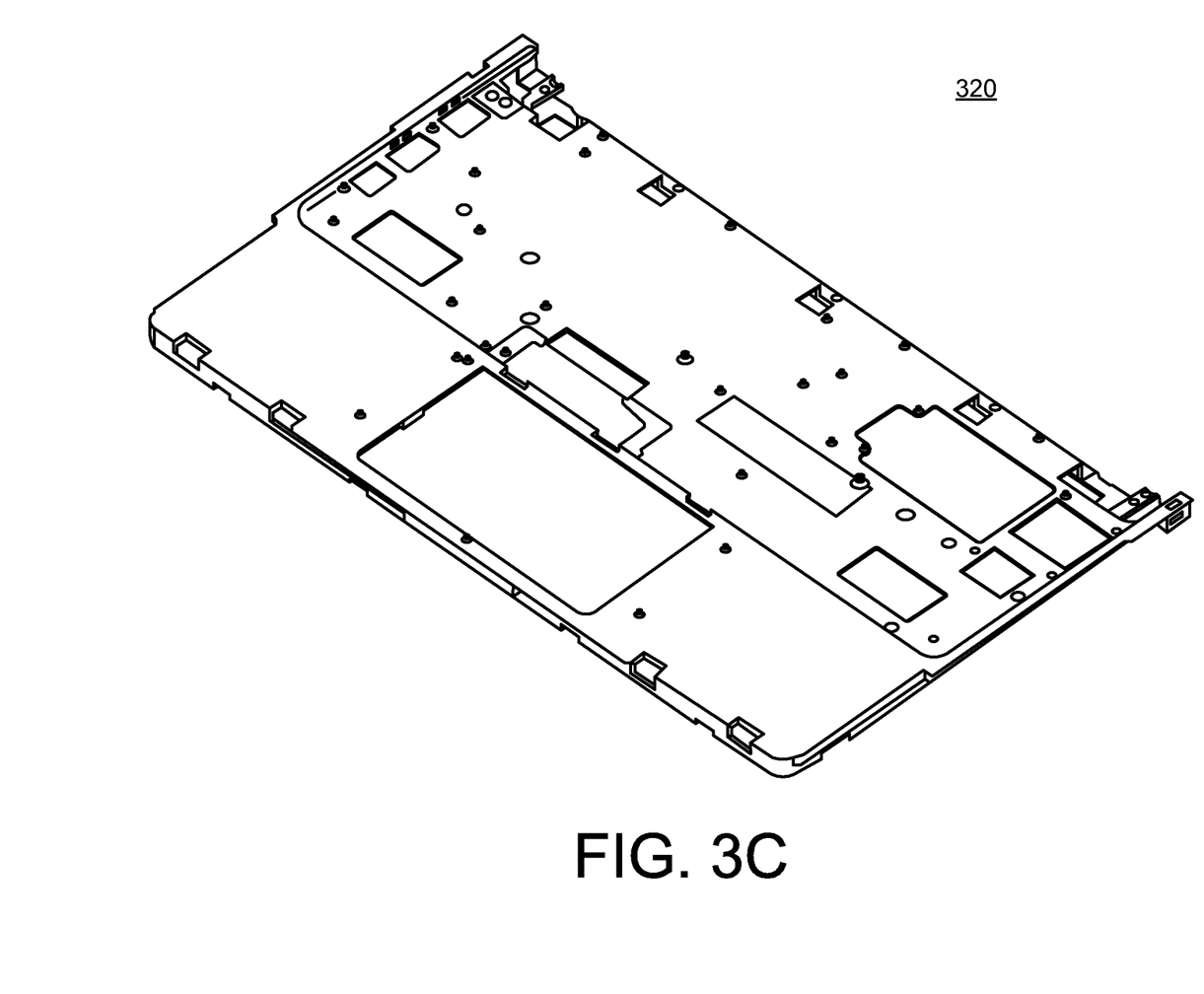

FIGS. 3A-3C show example parts (e.g., a base frame or cover 310 and midplane plate 320) of a bottom housing (e.g., bottom housing 23) of a laptop computer that may be thermally bonded together by applying spatially varying amounts of heat in a thermal press, in accordance with the principles of the disclosure herein. It will be noted that FIGS. 3A and 3B show a face-up view and a face-down view of base frame or cover 310, respectively, and FIG. 3B shows a face-up view of midplane plate 320.

With reference to FIGS. 3A and 3B, example base frame or cover 310 may be a cosmetic cover portion of bottom housing 23. Cover 310 may be made of plastic materials, for example, polycarbonate, polyvinyl chloride (PVC), acrylonitrile butadiene styrene (ABS), metal-filled PVC/ABS or blends thereof. In an example implementation, cover 310 may have walls that are nominally about 1.4 mm thick. Cover 310 may include cutouts 312 and 314 for a keyboard and a track pad of the laptop computer, respectively. Cover 310 may include relatively solid or continuous areas 315 next to track pad cutout 314, which may serve as palm rest areas for a user of the laptop computer. Further, cover 310 may have a rim 316 with an inwardly facing undercut 318, which may form a generally C-shaped slot or channel to hold or support edges of laptop computer components (e.g., midplane plate 320) enclosed in bottom housing 23.

With reference to FIG. 3C, example midplane plate 320, which may be made of metal or a metal alloy, may be designed as a base or foundation to structurally support various electronic components (e.g., keyboard switches, circuit boards, track pad, etc.) and associated wiring (not shown) enclosed in bottom housing 23. Midplane plate 320 may, for example, have a non-uniform topography and include several cutouts to accommodate the various electronic components and associated wiring, etc. The various electronic components may, for example, be mounted on midplane 320 with mechanical means such as screws, bolts, or fasteners (not shown). In an example implementation, midplane plate 320 may be made of aluminum, magnesium or a magnesium-aluminum alloy. Midplane plate 320 may have a nominal thickness of about 1.4 mm, but may have large variations in thickness across its lateral extent.

Figure 4A:
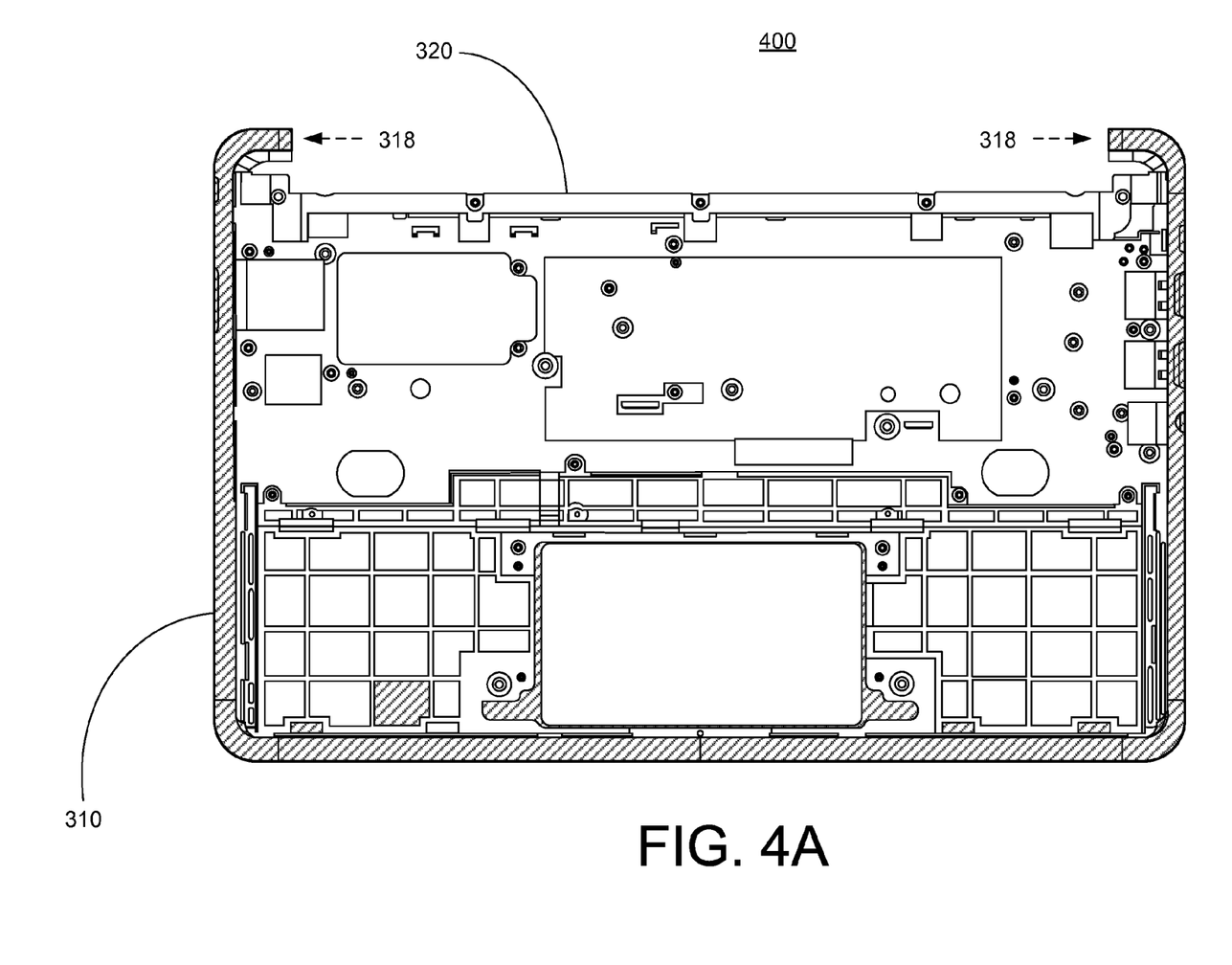
FIGS. 4A and 4B are illustrations of an example assembly of the parts of FIGS. 3A-3C, in accordance with the principles of the disclosure herein.
Figure 4B:
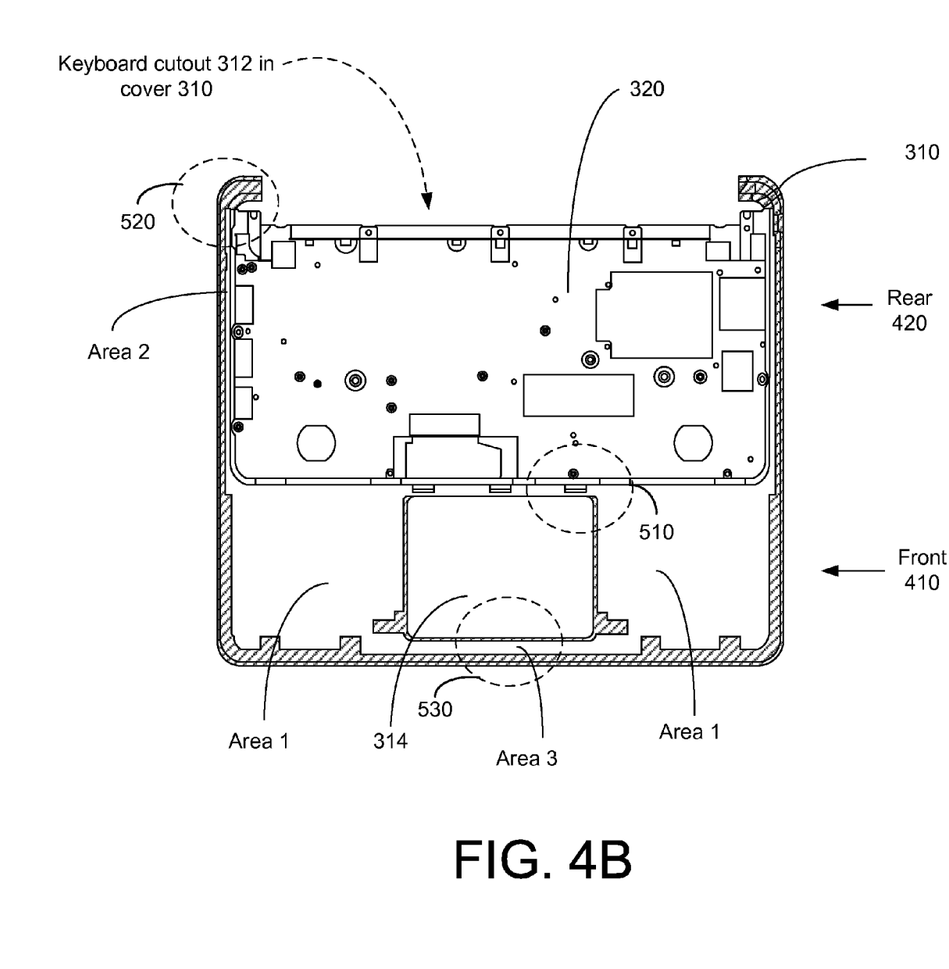

FIGS. 4A and 4B are illustrations of an example assembly 400 of base frame or cover 310 and midplane plate 320, in accordance with the principles of the disclosure herein. It is noted that FIGS. 4A and 4B show views of assembly 400 with cover 310 and midplane plate 320 face-down and face-up, respectively.

While assembling bottom housing 23, midplane plate 320 may be tilted and slid into cover 310 so that edges of midplane plate 320 rest in undercut 318 to form assembly 400 (FIG. 4A). In an example implementation, assembly 400 may have lateral dimensions of about 300 mm by 200 mm and a thickness of about 5-10 mm With renewed reference to the process for thermal bonding of cover 310 and midplane plate 320, it will be understood that a thermoplastic adhesive film (e.g., film 130) may be applied over contact or bonding areas of the latter before it is slid into cover 310 to form assembly 400. FIG. 4B, which shows a face-down view of assembly 400, illustrates bonding areas (e.g., bonding areas 1, 2 and 3) between midplane plate 320 and cover 310. To bond midplane plate 320 to cover 310, a heated press block of a thermal press may be directly applied to exposed areas of midplane plate 320 through an open face of cover 310 to heat and press assembly 400. However, bonding areas (e.g., bonding areas 2 and 3) in the undercut rim 316 of cover 310 may not be amenable to direct contact with the heated block and may be heated only by lateral thermal conduction through midplane plate 320. Further, thickness variations, cutouts and other structural non-uniformities in midplane plate 320 may result in non-uniform thermal mass distributions across assembly 400. The non-uniform thermal mass distributions may make it difficult to achieve uniform softening temperatures across the bonding areas of assembly 400 when using a heated block such as heated press block 110 of thermal press 100, which is heated to a single temperature $T_1$.

Figure 5A:
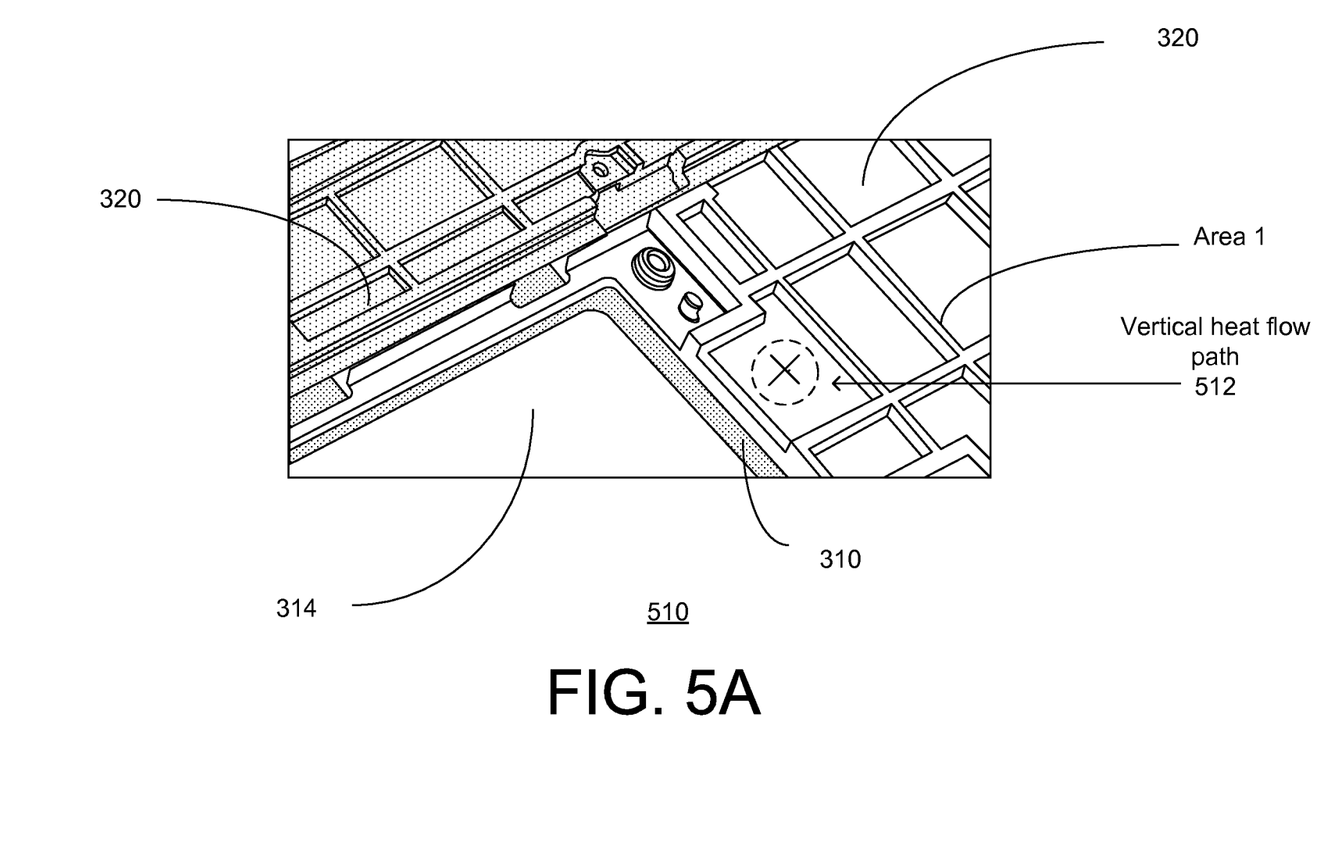
FIGS. 5A-5C are pictorial illustrations of the different mechanical and geometric characteristics of the bonding areas of the assembly illustrated in FIGS. 4A and 4B.
Figure 5B:
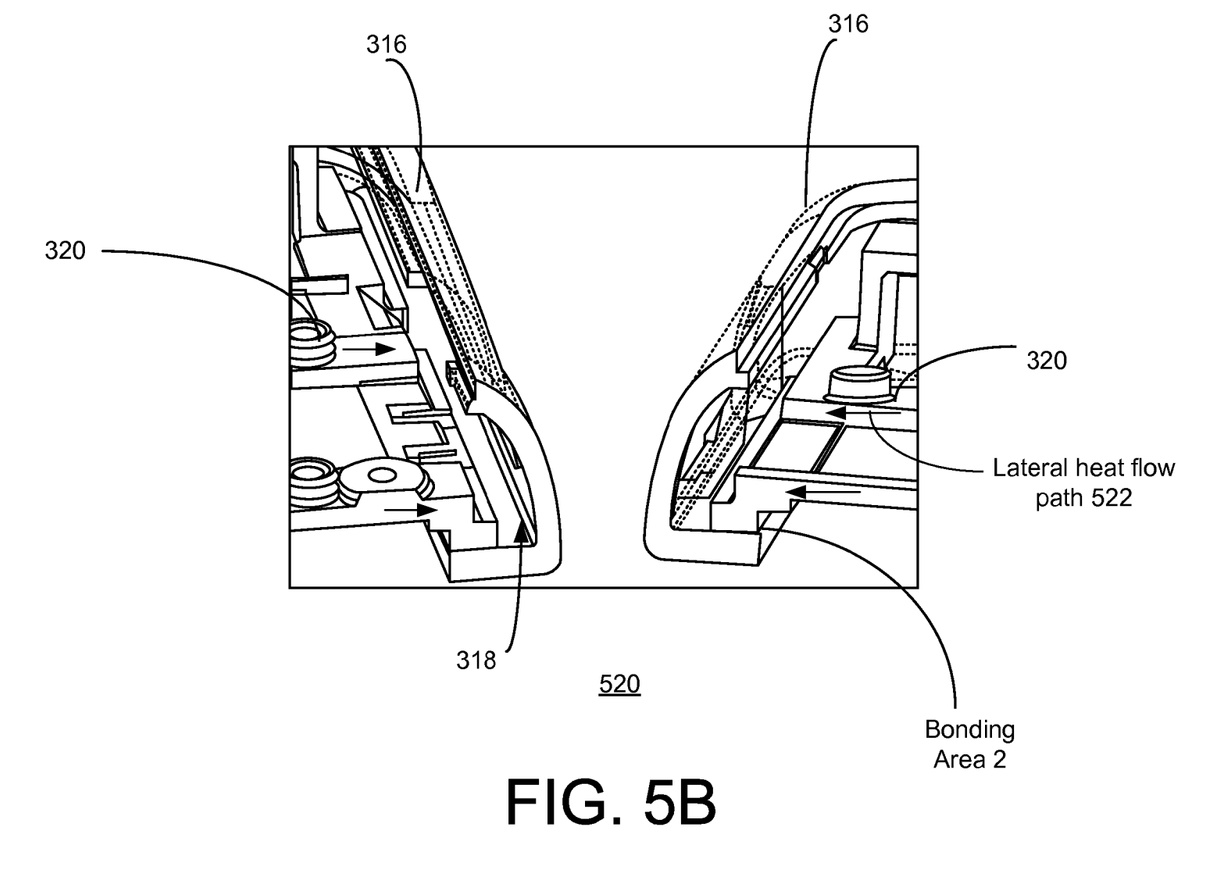
Figure 5C:
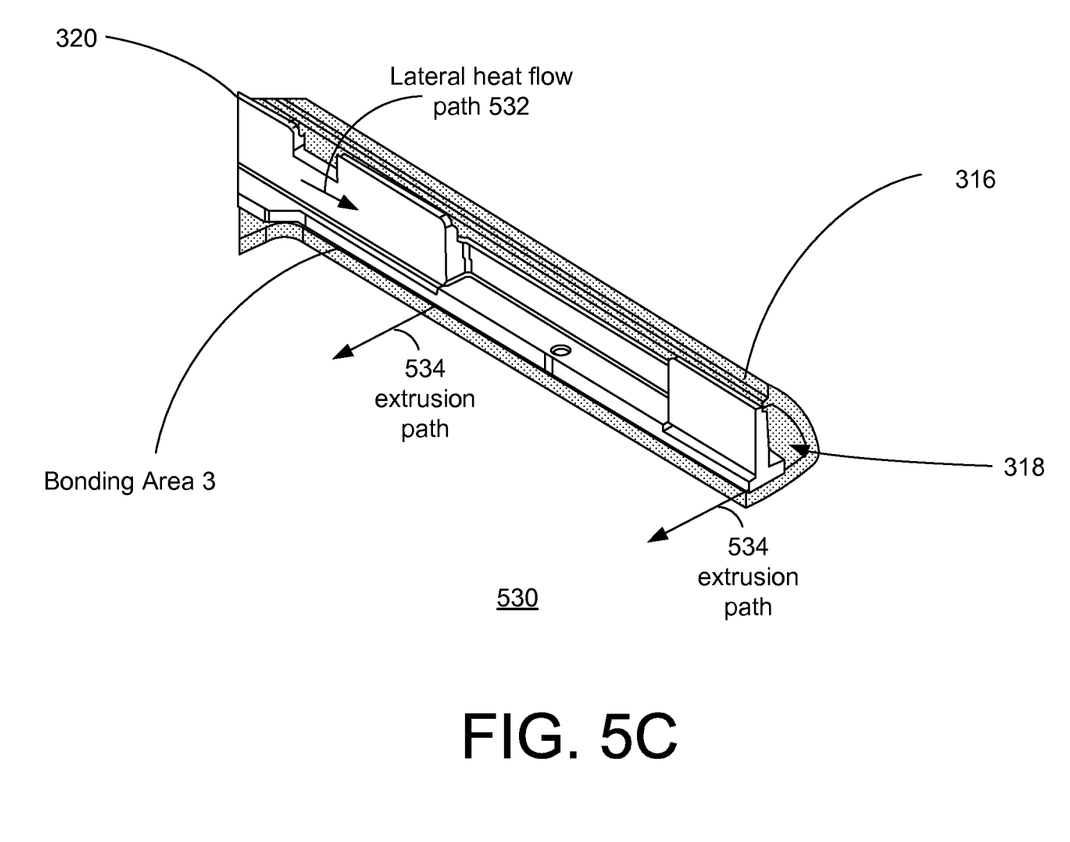

With reference to FIG. 4B, bonding areas 1, 2 and 3 may have different thermal characteristics with respect to heat flow from a heated press block (e.g., heated press block 110 or 112) via thermal pathways through midplane plate 320. The different thermal characteristics of bonding areas 1-3 may be a result of the different mechanical and geometric characteristics of midplane plate 320 in the vicinity of the bonding areas. FIGS. 5A-5C pictorially depict the different mechanical and geometric characteristics of bonding areas 1-3 in regions 510-530 shown in FIG. 4B, respectively.

Bonding area 1 in region 510 (FIG. 5A), which may be accessible to a vertically moving heated press block, may have vertical heat flow paths 512 through midplane plate 320 that may have a relatively uniform thickness across bonding area 1. In contrast to bonding area 1, bonding area 2 in region 520 (FIG. 5B) and bonding area 3 in region 530 (FIG. 5C), which may be in undercut region 318 of rim 316, may not be accessible to a vertically moving heated press block. Heat flow paths 522 to bonding area 2 in area 520 and heat flow paths 532 bonding area 3 in area 530 may extend laterally through midplane plate 320. Further, as shown in FIGS. 5B and 5C, there may be large local variations in the thickness of midplane plate 320 in the vicinity of bonding areas 2 and 3, which may make lateral heat flows to bonding areas 2 and 3 non-uniform. Bonding area 3 may also present a risk of squeeze out or extrusion of the softened thermoplastic adhesive along path 534 into track pad cutout 314.

By using multi-zone heating elements in a heated press block of the thermal press, different portions of assembly 400 can be heated to different temperatures, in accordance with the principles of the disclosure herein. Heating different portions of assembly 400 to different temperatures may compensate for the non-uniform thermal mass distributions and achieve relatively uniform adhesive softening temperatures across the bonding areas of assembly 400 including bonding areas (e.g., bonding areas 2 and 3) next to cutouts or in the undercut rim of cover 310

In an example thermal bonding process, assembly 400 may be heat and pressure treated in a thermal press having a heated bottom nest and a heated pressing nest or block similar to thermal press 100 shown in FIG. 1B. Assembly 400 may be placed in the heated bottom nest, which may be heated to about 50° C. This degree of heating may assist in tacking or lightly bonding the thermoplastic adhesive between cover 310 and midplane plate 320 in assembly 400. Then, the heated pressing nest or block (e.g., heated press block 112) may be vertically applied to midplane plate 320 through the open face of cover 310 in assembly 400 with a force of about 90 kgf for a dwell time of about 20 seconds. Heating elements in heated pressing nest may be arranged so that there are two heated zones (e.g., zone 1 and zone 2) of the heated pressing nest. Zone 1 corresponding to a front portion of the heated pressing nest may contact a front portion 410 of assembly 400 (FIG. 4B) above bonding area 1 and adjoining track pad area 314. Zone 2 corresponding to a rear portion of the heated pressing nest may contact a rear portion 420 of assembly 400 (FIG. 4B) corresponding to keyboard cutout 312 in cover 310 next to bonding area 2. To apply spatially varying amounts of heat to assembly 400, zone 1 may be heated to about 190° C., while zone 2 may be heated to about 240° C. The lower temperature (190° C.) applied to front portion 410 of assembly 400 may allow sufficient heat to be conducted through vertical thermal pathways 512 across midplane plate 320 to bonding area 1 to properly soften the thermoplastic adhesive there for effective bonding. The higher temperature applied to rear portion 420 of assembly 400 may allow sufficient heat to be conducted through lateral thermal pathways 522 in midplane plate 320 to bonding area 2 (FIG. 5B) to properly soften the thermoplastic adhesive there for effective bonding. Assembly 400 may then be cooled to about room temperature under a cooling nest for about 20 seconds with a force of about 85 kgf.

Figure 6:
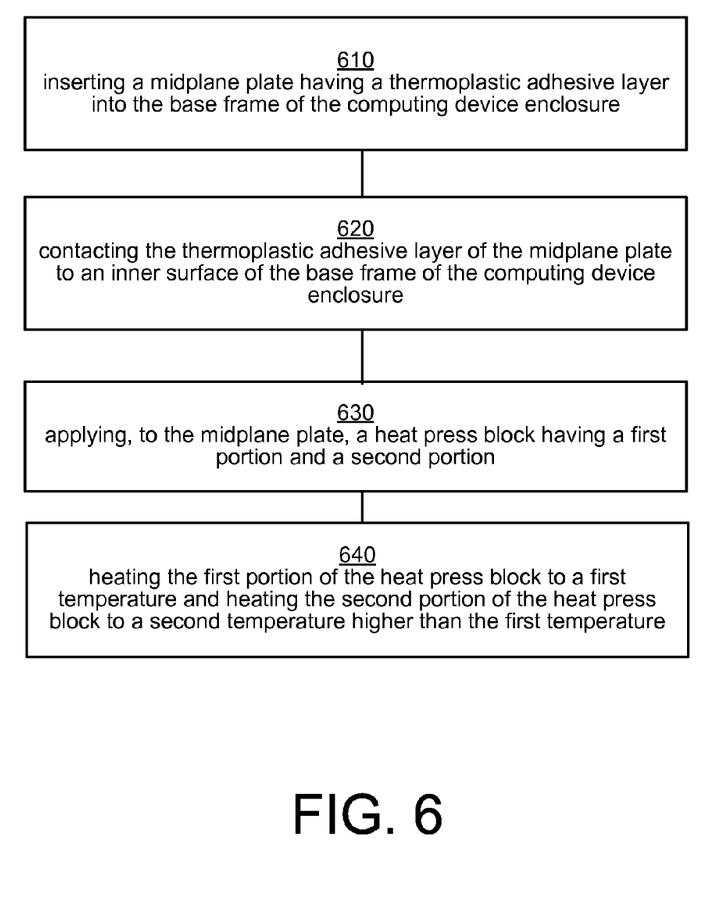
FIGS. 6-8 are illustrations of example methods for thermally bonding parts of a computing device enclosure, in accordance with the principles of the disclosure herein.
Figure 7:
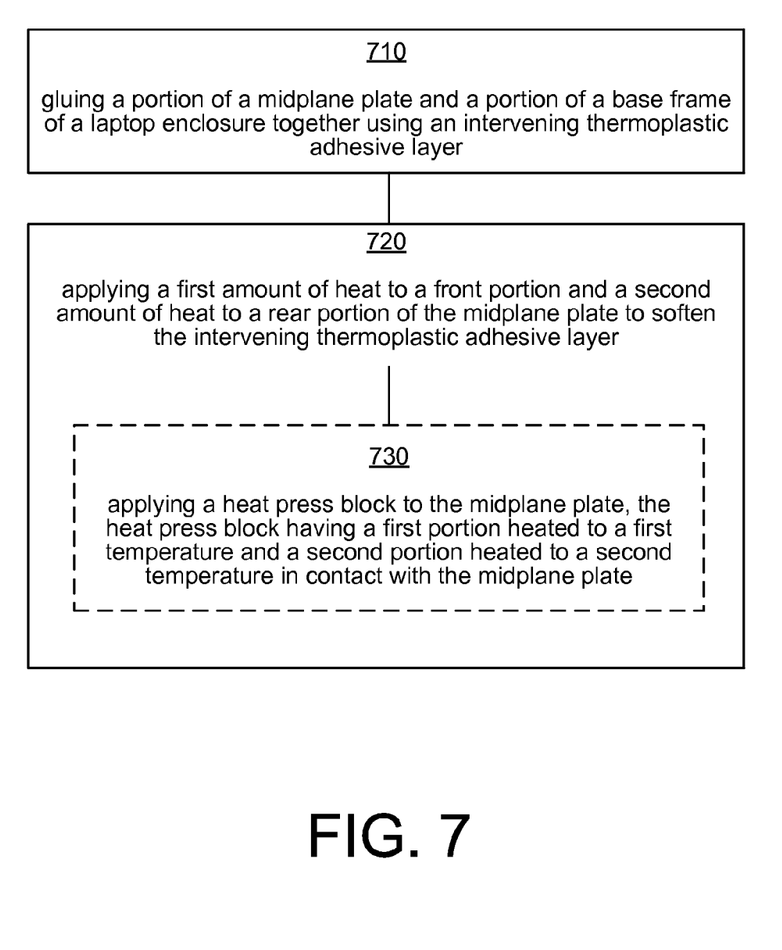
Figure 8:
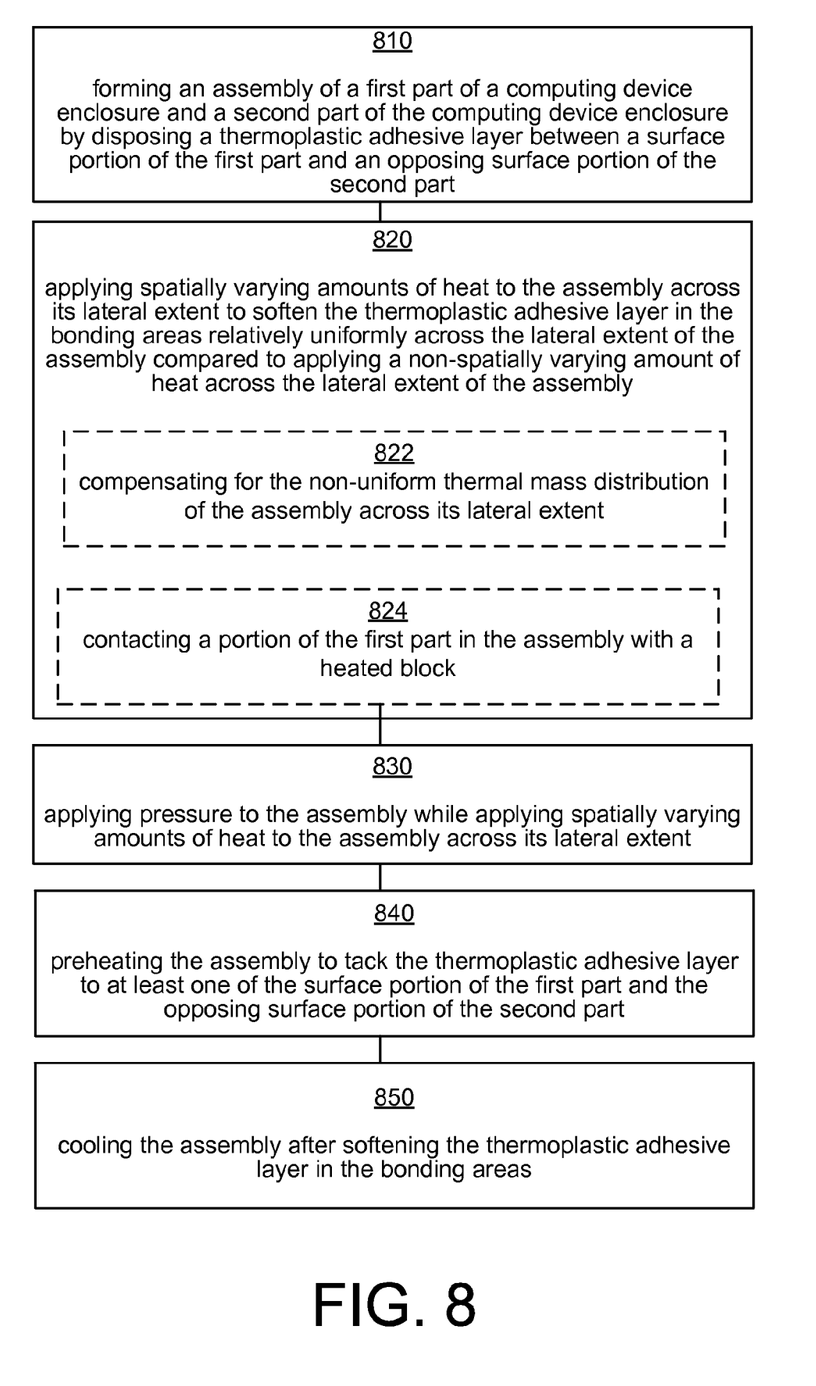

FIGS. 6-8 respectively show example methods 600, 700 and 800 for thermally bonding together parts of a computing device enclosure, in accordance with the principles of the disclosure herein. The parts bonded together may, for example, include a base frame or cover and a midplane plate. The base frame or cover may be made of plastic material (e.g., polyvinyl carbonate, acrylonitrile butadiene styrene, or a blend thereof). The midplane plate may be made of a metal or metal alloy (e.g., aluminum, magnesium or an aluminum-magnesium alloy).

With reference to FIG. 6, method 600 includes inserting the midplane plate having a thermoplastic adhesive layer into the base frame of the computing device enclosure (610), contacting the thermoplastic adhesive layer of the midplane plate to an inner surface of the base frame of the computing device enclosure (620), and applying, to the midplane plate, a heat press block having a first portion and a second portion (630).

Method 600 further includes heating the first portion of the heat press block to a first temperature and heating the second portion of the heat press block to a second temperature higher than the first temperature (640). The first temperature may, for example, be about 190° C. The second temperature may, for example, be about 240° C. In method 600, the first portion heated to the first temperature may be in contact with a front portion of the midplane plate adjoining a track pad area of the computing device enclosure, while the second portion heated to the second temperature may be in contact with a rear portion of the midplane plate adjoining a key board area of the computing device enclosure.

Method 600 may further include placing the base frame in a bottom nest that is heated to about 50° C. while applying the heat press block to the midplane plate.

With reference to FIG. 7, method 700 includes gluing or coupling a surface portion of a midplane plate and a surface portion of a base frame of a laptop enclosure together using an intervening thermoplastic adhesive layer (710), and applying a first amount of heat to a front portion and a second amount of heat to a rear portion of the midplane plate to soften the intervening thermoplastic adhesive layer (720). Applying a first amount of heat to a front portion and a second amount of heat to a rear portion of the midplane plate 720 may include applying a heat press block to the midplane plate, the heat press block having a first portion heated to a first temperature and a second portion heated to a second temperature in contact with the midplane plate (730).

With reference to FIG. 8, method 800 includes forming an assembly of a first part of a computing device enclosure and a second part of the computing device enclosure by disposing a thermoplastic adhesive layer between a surface portion of the first part and an opposing surface portion of the second part (810). The surface portion of the first part and the opposing surface portion of the second part may define one or more bonding areas of the first part and the second part across a lateral extent of the assembly. The assembly may have a non-uniform thermal mass distribution across its lateral extent. Method 800 further includes applying spatially varying amounts of heat to the assembly across its lateral extent to soften the thermoplastic adhesive layer in the bonding areas relatively uniformly across the lateral extent of the assembly compared to applying a non-spatially varying amount of heat across the lateral extent of the assembly (820).

Applying spatially varying amounts of heat to the assembly across its lateral extent 820 may include compensating for the non-uniform thermal mass distribution of the assembly across its lateral extent (822). Further, applying spatially varying amounts of heat to the assembly across its lateral extent 820 may include contacting a portion of the first part in the assembly with a heated block (824). The heated block may have multiple zones in contact with the portion of the first part, each heated to a different temperature. In an example implementation, the heated block has two zones in contact with the portion of the first part, each heated to a different temperature.

In method 800, at least one of the bonding areas may be in a region of the assembly that is not amenable to direct contact by the heated block and which may be heated by lateral thermal conduction from the portion of the first part contacted by the heated block. Conversely, at least one of the bonding areas may be in a region of the assembly that is amenable to direct contact by the heated block and which may be heated by vertical thermal conduction through the portion of the first part contacted by the heated block.

Method 800 may further include applying pressure to the assembly while applying spatially varying amounts of heat to the assembly across its lateral extent (830), preheating the assembly to tack the thermoplastic adhesive layer to at least one of the surface portion of the first part and the opposing surface portion of the second part (840), and cooling the assembly after softening the thermoplastic adhesive layer in the bonding areas (850).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   inserting a midplane plate having a thermoplastic adhesive layer into a base frame of a computing device enclosure;
   contacting the thermoplastic adhesive layer of the midplane plate to a surface of the base frame of the computing device enclosure;
   applying, to the midplane plate, a heat press block having a first portion and a second portion in contact with the midplane plate; and
   heating the first portion of the heat press block to a first temperature and heating the second portion of the heat press block to a second temperature higher than the first temperature.

2. The method of claim 1, wherein the first portion heated to the first temperature is in contact with a front portion of the midplane plate adjoining a track pad area of the computing device enclosure.

3. The method of claim 1, wherein the second portion heated to the second temperature is in contact with a rear portion of the midplane plate adjoining a key board area of the computing device enclosure.

4. The method of claim 1, wherein the first temperature is about 190° C. and the second temperature is about 240° C.

5. The method of claim 1, wherein the base frame is made of polycarbonate, polyvinyl chloride, acrylonitrile butadiene styrene, or a blend thereof.

6. The method of claim 1, wherein the midplane plate is made of aluminum, magnesium or an aluminum-magnesium alloy.

7. The method of claim 1, further comprising, placing the base frame in a bottom nest that is heated to about 50° C. while applying the heat press block to the midplane plate.

8. A method, comprising:
   coupling a surface portion of a midplane plate and a surface portion of a base frame of a laptop enclosure together using an intervening thermoplastic adhesive layer; and
   applying a first amount of heat to a front portion of the midplane plate and a second amount of heat to a rear portion of the midplane plate to soften the intervening thermoplastic adhesive layer.

9. The method of claim 8, wherein applying a first amount of heat to a front portion of the midplane plate and a second amount of heat to a rear portion of the midplane plate includes applying a heat press block to the midplane plate, the heat press block having a first portion heated to a first temperature and a second portion heated to a second temperature in contact with the midplane plate.

10. The method of claim 8, wherein the midplane plate is made of a metal or metal alloy.

11. A method, comprising:
    forming an assembly of a first part of a computing device enclosure and a second part of the computing device enclosure by disposing a thermoplastic adhesive layer between a surface portion of the first part and an opposing surface portion of the second part, the surface portion of the first part and the opposing surface portion of the second part defining one or more bonding areas of the first part and the second part across a lateral extent of the assembly, the assembly having a non-uniform thermal mass distribution across its lateral extent; and
    applying spatially varying amounts of heat to the assembly across a lateral extent of the assembly to soften the thermoplastic adhesive layer in the one or more bonding areas relatively uniformly across the lateral extent of the assembly compared to applying a non-spatially varying amount of heat across the lateral extent of the assembly.

12. The method of claim 11, wherein the first part of the computing device enclosure includes a metal or metal alloy and the second part of the computing device enclosure includes a plastic material.

13. The method of claim 11, wherein applying spatially varying amounts of heat to the assembly across its lateral extent includes compensating for the non-uniform thermal mass distribution of the assembly across its lateral extent.

14. The method of claim 11, wherein applying spatially varying amounts of heat to the assembly across its lateral extent includes contacting a portion of the first part in the assembly with a heated block, the heated block having multiple zones in contact with the portion of the first part, each heated to a different temperature.

15. The method of claim 14, wherein the heated block has two zones in contact with the portion of the first part, each heated to a different temperature.

16. The method of claim 14, wherein at least one of the bonding areas is in a region of the assembly that is not amenable to direct contact by the heated block and is heated by lateral thermal conduction from the portion of the first part contacted by the heated block.

17. The method of claim 14, wherein at least one of the bonding areas is in a region of the assembly that is amenable to direct contact by the heated block and is heated by vertical thermal conduction through the portion of the first part contacted by the heated block.

18. The method of claim 11, further comprising, applying pressure to the assembly while applying spatially varying amounts of heat to the assembly across its lateral extent.

19. The method of claim 11, further comprising, preheating the assembly to tack the thermoplastic adhesive layer to at least one of the surface portion of the first part and the opposing surface portion of the second part.

20. The method of claim 11, further comprising, cooling the assembly after softening the thermoplastic adhesive layer in the bonding areas.

* * * * *